United States Patent [19]

Deike et al.

[11] Patent Number: 4,493,510
[45] Date of Patent: Jan. 15, 1985

[54] BRAKE PRESSURE CONTROL VALVE FOR TRACTOR-TRAILER VEHICLES

[75] Inventors: Karl-Heinz Deike, Pattensen; Hans-Joachim Schulz, Wedemark; Jürgen Sandmann, Wennigsen, all of Fed. Rep. of Germany

[73] Assignee: WABCO Fahrzeugbremsen GmbH, Hanover, Fed. Rep. of Germany

[21] Appl. No.: 495,901

[22] Filed: May 18, 1983

[51] Int. Cl.³ .............................................. B60T 15/02
[52] U.S. Cl. .................................. 303/28; 137/627.5; 303/40
[58] Field of Search .................... 303/40, 28, 29, 30, 303/7, 8, 13, 14, 6 R, 22 A, 50–56, 22 R; 188/3 R, 112, 195; 137/627.5

[56] References Cited

U.S. PATENT DOCUMENTS

| 3,219,395 | 11/1965 | Schwartz | 303/40 X |
| 3,545,820 | 12/1970 | Scott et al. | 303/40 X |
| 3,944,294 | 3/1976 | Masuda et al. | 303/40 |
| 4,418,965 | 12/1983 | Reinecke | 303/40 X |

FOREIGN PATENT DOCUMENTS 2431259  1/1976  Fed. Rep. of Germany ........ 303/28

Primary Examiner—Douglas C. Butler
Attorney, Agent, or Firm—J. B. Sotak

[57] ABSTRACT

This invention relates to a brake pressure control valve and, more particularly, to a tractor-trailer control valve which includes a differential pressure surface relay piston that on one hand is acted upon by the control pressure from a control chamber and on the other hand by modulated pressure from a working chamber. The brake pressure control valve includes a first combination inlet and outlet valve which works together with the relay piston whereby the working chamber can be pressurized and vented via the first inlet and outlet valves. An auxiliary control chamber which is defined by the differential surfaces of the relay piston is connectable either to the working chamber or to the control chamber via second inlet and outlet valves. The pressure control surface of the relay piston is located opposite the working surface that is acted upon by control pressure in the control chamber. The pressure control surface can be enlarged by the pressure surface of the auxiliary control chamber. Thus, it is possible to modulate a pressure with an initial relatively sharp rise which is followed by a less gradual increase. In order to have a substantially equal characteristic curve during brake pressure decrease as well as during brake pressure buildup, and in order to reduce the hysteresis of the brake pressure control valve, the auxiliary control chamber is no longer vented into the working chamber but is directly vented to the atmosphere. The fluid pressure supply of the inlet valve is separated from the fluid pressure exhaust of the outlet valve of the second combination inlet and outlet valve.

15 Claims, 1 Drawing Figure

U.S. Patent   Jan. 15, 1985   4,493,510
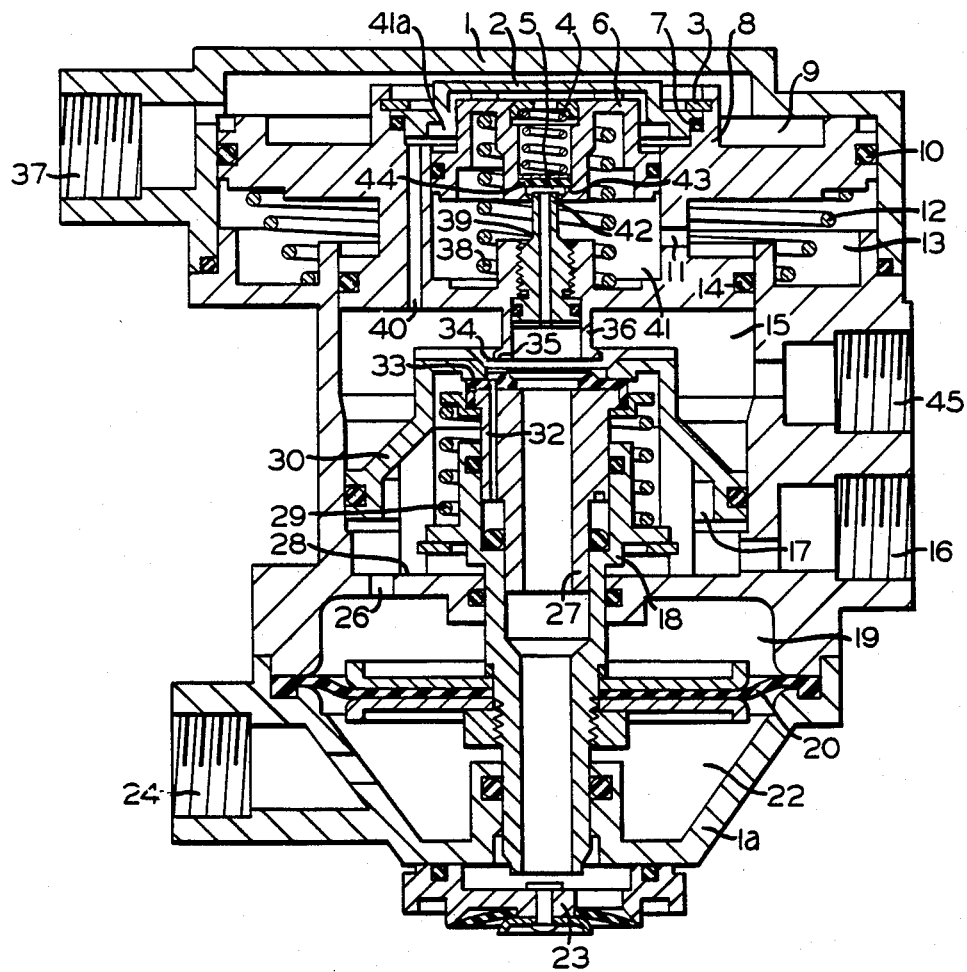

BRAKE PRESSURE CONTROL VALVE FOR TRACTOR-TRAILER VEHICLES

FIELD OF THE INVENTION

This invention relates to a brake pressure control valve for pneumatic vehicle brake equipment and, more particularly, to a tractor-trailer control valve apparatus in which the characteristic curve of the pressure buildup is substantially the same as the characteristic curve of the pressure release so as to minimize the effects of hysteresis.

BACKGROUND OF THE INVENTION

In tractor trailers, the control valves serve the purpose of controlling the pressure of a trailer brake system in accordance with the pressure in the brake circuit of the tractor or motor vehicle.

The pressure control takes place in such a way that the compressed air flows into the control chamber of the trailer control valve when operating the motor vehicle brake valves. This causes the relay piston, which is functionally interconnected to a combination inlet and outlet valve, to move downwardly for initial closing of the outlet valve which is directly connected through a vent valve to atmosphere. As the relay piston moves further downwardly, the inlet valve which is interposed between a pressure supply chamber and a main working chamber is opened.

The compressed air in the inlet pressure supply chamber which is received from a suitable pressure air supply tank, is conveyed to the control chamber of the trailer brake valve via the main working chamber. That is, the fluid pressure line which leads to a trailer brake valve of the trailer braking system is pressurized when the inlet valve is opened. Once the modulated pressure has risen to a certain level, which is related to the motor brake control pressure and the working surfaces of the relay piston, the relay piston is moved upward by the pressure in the working chamber and the inlet valve will become closed. The trailer control valve is in a lap position. If the motor vehicle brake control pressure is released, the modulated pressure acting upon the relay piston dominates and slides the relay piston further upwardly. As the relay piston moves upwardly, the outlet valve opens and the pressure from the control chamber of the secondary trailer brake valve, as well as the fluid pressure valve leading to the trailer brake valve, is reduced by way of the control valve.

The trailer control valves should exhibit an arrangement which affects a lead or faster build-up of brake pressure in the wheel brake cylinder of the trailer as compared to the motor vehicle. After the rapid build-up of brake pressure in the wheel brake cylinder of the trailer, the motor vehicle and trailer remain straight, even in the case of a rapid deceleration.

A known trailer control valve used in system No. 973 002 601.0 of WABCO Vehicle Brakes GmbH is provided with an auxiliary control chamber to achieve the forward slip. The auxiliary control chamber is limited by a multi-stepped relay piston. A second combination inlet and outlet valve and the auxiliary control chamber are connected with the working chamber of the trailer control valve. At a given pressure load of the relay piston by control pressure, the relay piston is shifted in the direction of the working chamber. This causes the outlet valve of the first combination inlet and outlet valve which connects the working chamber with the atmosphere to be closed, and then causes the inlet valve which connects the control chamber of a secondary trailer brake valve with a pressure air supply tank to be opened. The pressure building up in the working chamber acts upon the contact working surface of the relay piston opposite to the control pressure. Simultaneously, the valve body of the second combination inlet and outlet valve is acted upon by the same pressure in the direction of the inlet valve.

If the pressure in the working chamber has risen to a point where it overcomes the force of the spring biasing the valve body of the inlet valve, the inlet valve opens and the pressure in the working chamber is conveyed to the auxiliary control chamber. The working surface of the relay piston which is in the opposite direction to the control pressure and limiting the auxiliary control chamber, is acted upon by pressure which is reduced as compared to the pressure from the working chamber. Due to the connection of the working surface, formed by the graduation of the relay piston and also acted upon by the outlet pressure, and the thus changed surface relationship, the pressure introduction into the trailer brake valve takes place according to a characteristic curve which in the beginning is very steep and becomes more level after the opening of the inlet valve of the second combination inlet and outlet valve.

If, for the purpose of reducing brake pressure in the wheel brake cylinder, the control pressure is exhausted, the relay piston is moved in the direction of the control chamber by the pressure in the working and auxiliary control chambers. The inlet valve of the first combination inlet and outlet valve closes then the outlet valve opens and the control chamber of the trailer brake valve is vented into the atmosphere via the working chamber and the vent valve of the tractor-trailer control valve. If the pressure in the working chamber of the trailer control valve has dropped so far that the pressure in the auxiliary control chamber is predominant, the outlet valve of the second combination inlet and outlet valve opens and the pressure from the auxiliary control chamber is reduced by way of the working chamber. The reduction of the pressure in the auxiliary control chamber and in the working chamber takes place in the ratio 1:1 compared to the reduction of pressure in the control chamber.

It will be appreciated that during the introduction of pressure into the auxiliary control chamber, the force of the spring which biases the inlet valve body and determines the forward lead must be overcome. However, during exhausting of the auxiliary control chamber, the spring force determining the forward lead has no influence on the brake pressure reduction in the auxiliary control chamber. Thus, the brake pressure reduction takes place according to a characteristic curve which deviates from the characteristic curve of the brake pressure build-up.

A further object of this invention is to provide a tractor-trailer brake valve for controlling the pressure in the trailer brake circuit in accordance with the pressure in the tractor brake circuit comprising, a housing having a first control inlet, a second control inlet, a fluid pressure inlet, a fluid pressure outlet and an exhaust port, a relay piston disposed within said housing and defining a main control chamber, a diaphragm piston disposed within the housing and defining first and second auxiliary working chambers, the diaphragm piston supporting a graduated tube having a first double valve body, an intermediate piston disposed with the housing and defining a main working chamber and a pressure supply chamber, the intermediate piston having a first inlet valve seat, the relay piston having an extension portion forming a first outlet valve seat, an operating piston cooperatively associated with the relay piston and defining first and second partial chambers, the operating piston is provided with a second inlet valve seat which cooperates with a second double valve body, the extension portion accommodating a fistulous insert forming a second outlet valve seat, a passageway connecting the main working chambers with the first partial chamber, a bore hole connecting the second partial chamber with an auxiliary control chamber.

The invention especially offers the advantage that the auxiliary control chamber is directly exhausted to the atmosphere so that the hysteresis is reduced substantially, and thus the responding behavior of the brake pressure control valve is improved significantly.

BRIEF DESCRIPTION OF THE DRAWING

The above objects and other attendant features and advantages of the invention will become more fully evident from the following detailed description when considered in connection with the accompanying drawing wherein:

The single FIGURE of the drawing shows a sectional view of a trailer control valve for a two-line trailer brake apparatus with a combination inlet and outlet valve for the control of the forward lead, whereby the outlet valve of the combination inlet and outlet valve system is directly connected with a venting port of the trailer control valve which leads to the atmosphere.

DETAILED DESCRIPTION OF THE INVENTION

Referring now to the single FIGURE of the drawing, there is shown a two-line trailer control valve which consists of an upper housing portion 1 and a lower housing portion 1a. As shown, a brake pipe vent valve device 23 is located in the lower extremity of the housing for venting to atmosphere. A relay piston 8 is located in the upper housing portion 1. The upper working surface of the piston 8 and the under surface of the top of the upper housing 1 form a main control chamber 9. The control connection 37 is connected to a brake line of the motor vehicle braking system which is not shown. Under the lower working surface of the relay piston 8, there is formed a main working chamber 15 which is connected with a fluid pressure line leading to a trailer brake valve via a fluid pressure outlet 45. The consequence is a relatively large hysteresis of the trailer control valve from which an impairment of the responding behavior of the brake pressure control valve results.

OBJECTS OF THE INVENTION

Therefore, it is an object of this invention to provide a unique brake pressure control valve, especially a trailer control valve, which exhibits smaller hysteresis in comparison to prior known brake pressure control valves.

Another object of this invention is to provide a brake pressure control valve for a vehicle braking system having a trailer brake control valve comprising, a relay piston responsive to a control pressure for controlling the operation of a first combination inlet and outlet valve in which the first inlet valve interconnects a fluid pressure inlet connection with a working chamber having a fluid pressure outlet connection and in which the first outlet valve interconnections the working chamber to an exhaust connection. The relay piston includes a piston surface which is acted upon by the control pressure fed to a control chamber, the relay piston includes a first partial surface which is acted upon by pressure fed to the working chamber and includes a second partial surface which is acted upon by pressure fed to an auxiliary control chamber, a second combination inlet and outlet valve in which the second inlet valve supplies pressure to the auxiliary control chamber in proportion to the control pressure, and in which the second outlet valve directly exhausts the auxiliary control chamber to the atmosphere.

The underside of the relay piston 8, in fact, is divided into a number of graduations wherein a first partial surface of the relay piston 8 defines the working chamber 15, as previously mentioned, while a second partial surface of the relay piston 8 serves the purpose of forming an auxiliary control chamber 13. The relay piston 8 includes two sealing rings 10 and 14 which are situated in associated annular grooves formed on the periphery of the piston 8. The rings 10 and 14 bear against the inner wall of the valve housing. The ring 10 seals the control chamber 9 from the auxiliary control chamber 13, and the ring 14 seals the working chamber 15 from the auxiliary control chamber 13. An intermediate piston 30 is capable of moving in a vertical direction a given amount which is determined by a clearance or gap 34. The piston 30 divides the upper housing portion from the lower housing portion 1a. Thus, the piston 30 separates a fluid pressure inlet chamber 17 which is connected with a fluid pressure inlet 16, from the working chamber 15. A circular lip 33 is formed on the underside opposite the clearance 34 of the piston 30 a inlet valve seat 33 of a first combination inlet and outlet valve. A juxtaposed double valve body 32 is located in abutting relationship with the inlet valve seat 33 which includes a shell-like extension 27 and works together with the inlet valve seat 33. The shell-like extension 27 of the double valve body 32 is guided in a sealed manner in a plural stepped tube 18. The valve 32 is biased in contact with the inlet valve seat 33 by means of tension spring 29 which engages a circular shoulder formed intermediate the ends of the tube 18. The tube 18 is guided in a bore formed in an internal jutting end wall 28 of the body portion of the valve housing. The end wall 28 separates the fluid pressure supply or inlet chamber 17 from an auxiliary working chamber 19, 22. The lower extremity of tube 28 is guided in a sealed manner in an opening formed in the bottom of the lower housing portion 1a. The auxiliary working chamber 19, 22 is divided into two partial chambers 19 and 22 by way of diaphragm piston 20. An orifice 26 is provided in the end wall 28 so that the first partial chamber 19 is with the fluid pressure inlet chamber 17. The second partial chamber 22 is a second brake circuit of the motor vehicle braking system via a fluid pressure connection 24. The relay piston 8 includes a hollow rod or cylindrical portion 36 protruding into the working chamber 15. It will be seen that the clearance 34 is the distance between the valve seat of the piston 30 and the underside of the outlet valve seat 35. Thus, the double valve body forms the outlet valve 35, 32 of the first combination inlet and outlet valve 32, 33, 35.

As shown, the first combination inlet and outlet valve 32, 33, 35 controls the condition of the working chamber 15 which can be supplied with air pressure and can be vented to atmosphere. The hollow boss 36 includes threaded fistulous insert 39 that extends into a first partial chamber 41 of the relay piston 8. In addition to chamber 41, the relay piston 8 includes a second partial chamber 41a. The upper portion of the insert 39 which extends into partial chamber 41 forms outlet valve seat 42 of a second combination inlet and outlet valve. An operating piston 6 separates the two partial chambers 41 and 41a. Thus, the operating piston 6 is disposed in the chambers 41 and 41a and is biased by the compressive force of the spring 38 in the direction of the insert 39 which serves as a rod. The operating piston 6 is provided with a central clearance 5, which includes a circular ledge extending inward radially, and which is designed as an inlet valve seat 43. Resting on the inlet valve seat 43 is a double valve body 44 which is biased downwardly by a spring 4. The body 44, along with inlet valve seat 43, form the inlet valve 43, 44. Conversely, the body 44, along with the outlet valve seat 42, form the outlet valve 42, 44 of the second combination inlet and outlet valve 42, 43, 44. The chambers 41 and 41a of the relay piston 8 are closed off from the control chamber 9 by means of a cover 2 and a sealing ring 7. The cover 2 is held in place by a retaining ring 3. An axial passageway 40 is provided in the relay piston 8, which interconnects the working chamber 15 with the partial chamber 41a of the relay piston 8. A radial bore 11 is provided in the relay piston 8 which interconnects the auxiliary control chamber 13 with the partial chamber 41. A conical spiral spring 12 is disposed between the underside of piston 8 and a shoulder formed on the upper portion of the housing 1. Thus, the relay piston 8 is biased or urged toward the control chamber 9.

Let us turn now to the operation and the function of the brake pressure control valve of the present invention. Let us assume that the various parts are in the positions, as shown in the drawing, and that the control chamber 9 is not pressurized and that fluid pressure is being supplied to the fluid pressure inlet chamber 17 as well as to the auxiliary working chamber 19.

Now, if the motor vehicle brake valve is operated by the driver, the fluid pressure flows from a first service brake circuit through the control connection 37 into the control chamber 9. The pressure begins building up in the control chamber 9 and starts to push the relay piston 8 downwardly in the direction of the working chamber 15. That is, the pressure buildup in control chamber 9 shifts the relay piston 8 toward the working chamber 15. This downward movement eventually causes the outlet valve seat 35 of the first combination inlet and outlet valve 32, 33 to seat against the double valve body 32. Thus, the outlet valve 32, 35 becomes closed so that the connection between the working chamber 15 and atmosphere is shut off. Now, as the downward movement of the relay piston 8 continues, the double valve body 32 is lifted from the inlet valve seat 33 so that the inlet valve 33, 32 of the first combination inlet and outlet valve 32, 33, 35 is brought into open position. The fluid pressure in the inlet chamber 17 is pressurized so that compressed air flows through the opened inlet valve 33, 32 into the working chamber 15 and passes through the pressure outlet 45 into the control chamber of the trailer brake valve of the trailer vehicle.

In operation, the pressure in the control chamber of the trailer brake valve will rise sharply in comparison to the increase of pressure in the brake circuit of the motor vehicle.

At the same time that the change occurs at the control connection 37, air pressure is supplied to the auxiliary working chamber 22 which is located below the diaphragm piston 20 from the second service brake circuit through the fluid pressure connection 24. However, since the working chamber 15 and the auxiliary working chamber 19 are pressurized, the pressure which acts on opposite sides of the piston 30 is equal, and since the pressure on the upperside of diaphragm piston 20 is not overcome by the pressure in chamber 22, the position of the piston 30 remains unchanged. Now, if a defect occurs and the first service brake circuit malfunctions, then only the fluid pressure in the control connection 24 builds up via the second service brake circuit. The resulting pressure buildup in the auxiliary working chamber 22 below the diaphragm piston 20 causes the piston 30 to move upwardly as viewed in the drawing. Thus, as the relay piston shifts and assumes its upper end position, it closes the outlet valve 32, 35 and opens the inlet valve 32, 33 so that the trailer brake valve and line is pressurized via outlet connection 45. This corresponds with the normal braking action of the motor vehicle which takes place when the trailer is braked via control connection 37.

It will be seen that the passageway 40 formed in relay piston 8 allows air pressure to flow from the working chamber 15 into the upper partial chamber 41a of the relay piston 8. This air pressure acts upon the upper working surface of the operating piston 6. If the pressure in the working chamber 15 and, in turn, in the partial chamber 41a, increases to the point that it overcomes the force of spring 38 and urges the operating piston 6 against the force of the pressure in the partial chamber 41a, the operating piston 6 moves downwardly in the direction of the partial chamber 41. This causes the double valve body 44 to become seated against the outlet valve seat 42. Thus, the outlet valve 42, 44 of the second combination inlet and outlet valve 42, 43, 44 will be closed. During the continued downward movement of the operating piston 6, the double valve body 44 is lifted off of the inlet valve seat 43, and thus the inlet valve 43, 44 of the second combination inlet and outlet valve 42, 43, 44 will become opened. The opening of the inlet valve 43, 44 allows compressed air to flow through bore 11 into the auxiliary control chamber 13. The pressure acts upon the second partial surface of the relay piston 8. The second partial surface, which is acted upon by the air pressure, and the first partial surface of the relay piston 8, which defines the working chamber 15, form a common working surface that is equal in size to the oppositely-located working surface of the relay piston 8 which is acted upon by control pressure. If the pressure in the auxiliary control chamber 13 and, in turn, in the partial chamber 41, increases to the point that the pressure in partial chamber 41 as well as the force of the spring 38 acting upon the operating piston 6 is equal to the force working against the force of the pressure in the partial chamber 41a acting upon the operating piston 6, the inlet valve 43, 44 of the second combination inlet and outlet valve 42, 43, 44 will be closed.

The pressure in the control chamber of the secondary trailer brake valve again rises with an intensity which follows the intensity of the pressure rising in the brake circuit of the motor vehicle.

Since the opposed working surfaces of the relay piston are equal in size, a pressure follows or coincides to the pressure increase of the control pressure, namely, the braking pressure of the motor vehicle, but will be higher by the amount of the lead and is modulated. If the total working surface formed by both partial surfaces is smaller or larger than the opposite working surface which is acted upon by the control pressure, a higher or lower pressure, respectively, is modulated.

In the event that the brake pressure in the wheel brake cylinders of the trailer vehicle is to be decreased or completely exhausted, the control pressure in the control chamber 9 is reduced. Since there is a resulting pressure difference between the pressure in the control chamber 9 and the pressure in the working chamber 15, as well as the auxiliary control chamber 13, the relay piston 8 moves upwardly in the direction of the control chamber 9. Accordingly, the outlet valve seat 35 is raised from the double valve body 32, so that the outlet valve 32, 35 of the first combination inlet and outlet valve 32, 33, 35 assumes an open position. The working chamber 15 leading to the trailer control valve and, in turn, the control valve of the trailer brake valve of the trailer vehicle, are vented to atmosphere via the outlet valve 32, 35 and the pressure release valve 23.

It will be seen that as the pressure decreases in the working chamber 15, the pressure in the partial chamber 41a of the relay piston 8, defined by the operating piston 6, is also reduced. The resulting pressure difference between the pressure in the partial chamber 41 and the pressure in the partial chamber 41a as well as the force of spring 38, causes the operating piston 6 to be pushed upwardly in the direction of partial chamber 41a. The upward movement lifts off the double valve body 44 from the outlet valve seat 42 of the second combination inlet and outlet valve 42, 43, 44. Thus, the auxiliary control chamber 13 is vented directly to atmosphere through bore 11, into partial chamber 41, outlet valve 42, 44, through hollow insert 39 and through release valve 23.

Since the auxiliary control chamber 13 is no longer dependent or under control of the pressure decrease in the working chamber 15, but is vented directly into the atmosphere, and since the pressure decrease in the auxiliary control chamber 13 is directly related to the force of the spring 38 which influences the lead, the characteristic curve for the pressure decrease phase essentially follows the same path as the characteristic curve of the pressure increase phase. This means a reduction of hysteresis of the trailer control valve.

Of course, it is also possible to have auxiliary control chamber 13 acted upon by the control pressure from control chamber 9 instead of the supply pressure from the working chamber 15. For this purpose, the cover 2 closing the chamber 41, 41a of the relay piston 8 is removed, and the passageway 40 connecting the working chamber 15 with the chamber 41, 41a is blocked off.

The apertured insert 39 is threaded into the cylinder portion 36 of the relay piston 8 in the direction of its longitudinal axle and is adjustable so that the operating piston 6 moves a given or a selected distance to operate the inlet or outlet valve, respectively, of the second combination inlet and outlet valve 42, 43, 44. It will be appreciated that the initial stress or tension of the spring 38 may be varied. Accordingly, the lead and/or lap of the brake pressure buildup in the wheel brake cylinder of the trailer vehicle of the motor vehicle can be adjusted to any desired value.

It will be appreciated that various changes and variations may be made to the present invention by those skilled in the art. Thus, it is understood that certain modifications, ramifications, and equivalents may be made therein within the metes and bounds of the appended claims without departing from the spirit and scope of the subject invention.

Having thus described the invention, what we claim as new and desire to secure by Letters Patent, is:

1. A brake pressure control valve for a vehicle braking system having a trailer brake control valve comprising, a relay piston responsive to a control pressure for controlling the operation of a first combination inlet and outlet valve in which the first inlet valve interconnects a fluid pressure inlet connection with a working chamber having a fluid pressure outlet connection and in which the first outlet valve interconnects said working chamber to an exhaust connection, said relay piston includes a piston surface which is acted upon by the control pressure fed to a control chamber, said relay piston includes a first partial surface which is acted upon by pressure fed to said working chamber and includes a second partial surface which is acted upon by pressure fed to an auxiliary control chamber, a second combination inlet and outlet valve in which the second inlet valve supplies pressure to said auxiliary control chamber in proportion to the control pressure, and in which the second outlet valve directly exhausts said auxiliary control chamber to atmosphere, said second combination inlet and outlet valve is arranged so that the fluid pressure supply to the second inlet valve is separated from the fluid pressure exhaust to the second outlet valve, the fluid pressure supply of the inlet valve is selectively connected with the control chamber and with the working chamber, and the fluid pressure exhaust of the outlet valve is directly connected to atmosphere, said second combination inlet and outlet valve is disposed within the relay piston, the second outlet valve of the second combination inlet and outlet valve is directly connected to the first outlet valve of the first combination inlet and outlet valve, said relay piston exhibits a first partial chamber and a second partial chamber which are separated by an operating piston, an extension disposed in the bottom of the first partial chamber and extending into the partial chamber as well as into the working chamber, the extension in the working chamber is an outlet valve seat for the first outlet valve of the first combination inlet and outlet valve, and the extension in the first partial chamber is an outlet valve seat for the second outlet valve of the second combination inlet and outlet valve, a circular shoulder is provided on the operating piston which functions as a second inlet valve seat for the second inlet valve of the second combination inlet and outlet valve, the second inlet valve seat includes a spring-loaded double valve body and which together with an outlet valve seat, forms the outlet valve of the second combination inlet and outlet valve, the second inlet valve is moved by the opeating piston to an open position while the second outlet valve assumes a closed position, a compression spring is disposed in the first partial chamber and has one end resting against the operating piston and has its other end resting on the bottom of the first partial chamber, the second partial chamber is connected with the working chamber by a passageway, the first partial chamber is connected with the auxiliary control chamber by a bore hole, and the first partial chamber is connected to atmosphere via the second outlet valve.

2. The brake pressure control valve, as defined in claim 1; wherein said extension accommodates a threaded insert which is adjustable along its longitudinal axis, said threaded insert is provided with a bore which runs in the direction of the longitudinal axis.

3. A tractor-trailer brake valve for controlling the pressure in the trailer brake circuit in accordance with the pressure in the tractor brake circuit comprising, a housing having a first control inlet, a second control inlet, a fluid pressure inlet, a fluid pressure outlet and an exhaust port, a relay piston disposed within said housing and defining a main control chamber, a diaphragm piston disposed within said housing and defining first and second auxiliary working chambers, said diaphragm piston supporting a graduated tube having a first double valve body, an intermediate piston disposed with said housing and defining a main working chamber and a pressure supply chamber, said intermediate piston having a first inlet valve seat, said relay piston having an extension portion forming a first outlet valve seat, an operating piston cooperatively associated with said relay piston and defining first and second partial chambers, said operating piston is provided with a second inlet valve seat which cooperates with a second double valve body, said extension portion accommodating a fistulous insert forming a second outlet valve seat, a passageway connecting said main working chambers with said first partial chamber, a bore hole connecting said second partial chamber with an auxiliary control chamber.

4. The tractor-trailer brake valve, as defined in claim 3, wherein a compression spring urges said relay piston toward said main control chamber.

5. The tractor-trailer brake valve, as defined in claim 3, wherein a compression spring urges said operating piston toward said first partial chamber.

6. The tractor-trailer brake valve, as defined in claim 3, wherein a compression spring normally urges said first inlet valve seat to closed position against said first double valve body.

7. The tractor-trailer brake valve, as defined in claim 3, wherein a compression spring urges said second inlet valve seat to a closed position against said second double valve body.

8. The tractor-trailer brake valve, as defined in claim 3, wherein said relay piston is displaced when brake pressure is conveyed through said first control inlet to said main control chamber.

9. The tractor-trailer brake valve, as defined in claim 8, wherein the displacement of said relay piston causes the closing of said first outlet valve seat by being seated against said first double valve body and causes the opening of said first inlet valve seat by being unseated from said first double valve body.

10. The tractor-trailer brake valve, as defined in claim 12, wherein the unseating of said first inlet valve seat allows fluid pressure to flow from said fluid pressure inlet into said pressure supply chamber through the open first inlet valve into said main working chamber to said fluid pressure outlet.

11. The tractor-trailer brake valve, as defined in claim 10, wherein the fluid pressure in said working chamber passes through said passageway into said first partial chamber for displacing said operating piston.

12. The tractor-trailer brake valve, as defined in claim 11, wherein the displacement of said operating piston causes the closing of said second outlet by being seated against said second double valve body and causes the opening of said second inlet valve seat by being unseated from said second double valve body.

13. The tractor-trailer brake valve, as defined in claim 12, wherein the unseating of said second inlet valve seat allows fluid pressure in said first partial chamber to flow through the open second inlet valve into said second partial chamber through said bore so that said relay piston is displaced to cause the closing of said first inlet valve seat by being seated against said first double valve body.

14. The tractor-trailer brake valve, as defined in claim 13, wherein said relay piston is completely returned to its initial position when brake pressure is removed from said first control inlet so that said outlet valve is opened to quickly exhaust said main working chamber to atmosphere through said exhaust port.

15. The tractor-trailer brake valve, as defined in claim 3, wherein said diaphragm piston displaces said graduated tube and said first double valve body to cause the seating of said first outlet valve and then to allow the fluid pressure to cause the unseating of said first inlet valve to permit fluid pressure to flow from said pressure supply chamber to said main working chamber when fluid pressure is conveyed through said second control inlet to said second working chamber in the absence of brake pressure in said first control inlet.

* * * * *

UNITED STATES PATENT AND TRADEMARK OFFICE
CERTIFICATE OF CORRECTION

PATENT NO. : 4,493,510
DATED : January 15, 1985
INVENTOR(S) : Karl-Heinz Deike et al It is certified that error appears in the above-identified patent and that said Letters Patent are hereby corrected as shown below:

Column 8, line 61, change "opeating" to --operating--

Column 10, line 10, delete "12" and insert --9--

Signed and Sealed this

Seventh Day of May 1985

[SEAL]

Attest:

DONALD J. QUIGG

Attesting Officer     Acting Commissioner of Patents and Trademarks